United States Patent [19]

Avery

[11] 4,426,415

[45] Jan. 17, 1984

[54] TUFTED CARPETING, ESPECIALLY ARTIFICIAL TURF, WITH TUFTS STITCHED THROUGH MULTIPLE LAYERS OF PRE-WOVEN BACKING MATERIAL OF DIFFERING GAUGE

[75] Inventor: George S. Avery, Rome, Ga.

[73] Assignee: V&L Manufacturing Company, Inc., Rome, Ga.

[21] Appl. No.: 329,828

[22] Filed: Dec. 11, 1981

[51] Int. Cl.³ ............................ B32B 7/08; B32B 7/10
[52] U.S. Cl. ....................................... 428/17; 428/95; 428/96; 428/97
[58] Field of Search ..................... 428/95, 96, 85, 17, 428/97

[56] References Cited

U.S. PATENT DOCUMENTS 2,713,012  7/1955  Hartstein ......................... 428/95 X

*Primary Examiner*—Alexander S. Thomas
*Attorney, Agent, or Firm*—Cushman, Darby & Cushman

[57] ABSTRACT

For producing tufted carpeting, especially for use as artificial turf for football fields and the like, the pile is stitched through two or more layers of woven backing fabric and then what will become the underside is coated with a pile-anchoring adhesive. The backing layers are of progressively finer gauge toward the face, with that closest to the face being sufficiently fine to prevent adhesive from leaking through to the face during application of the adhesive. By preference the backing layers range in gauge from 11 picks per inch to 20 picks per inch.

8 Claims, 5 Drawing Figures

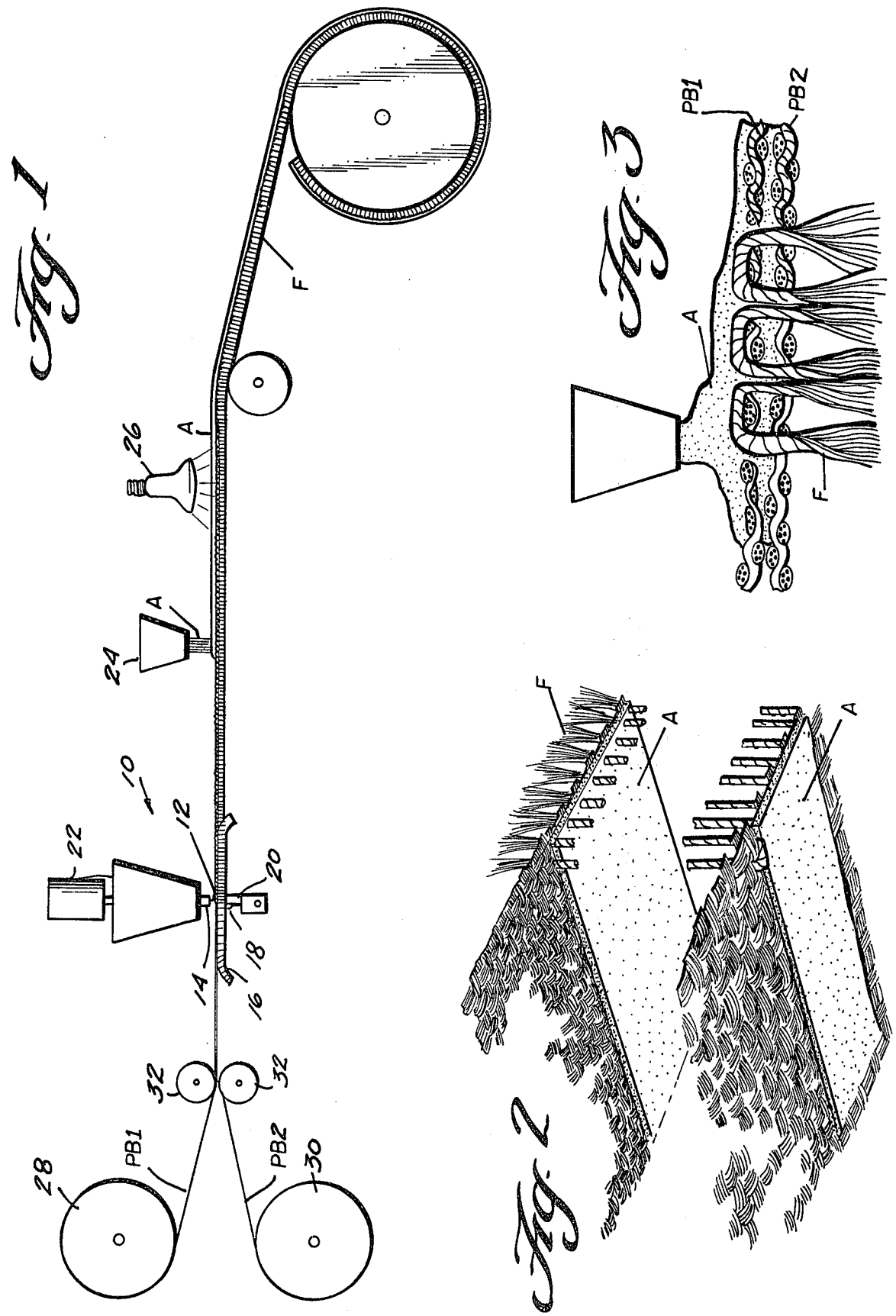

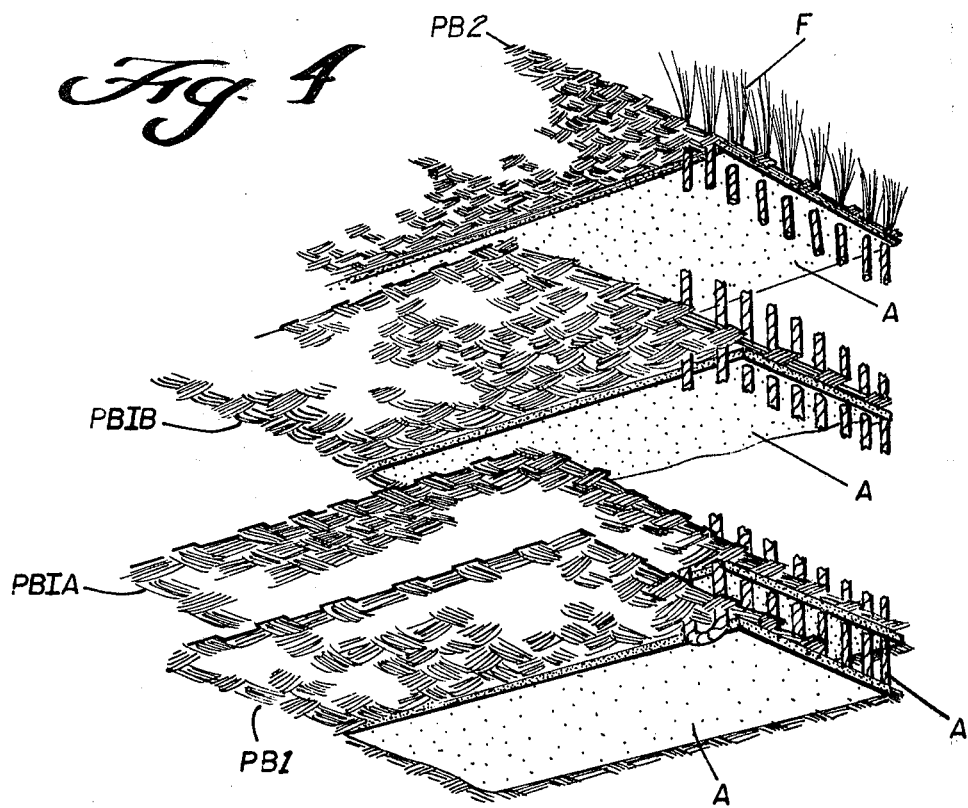
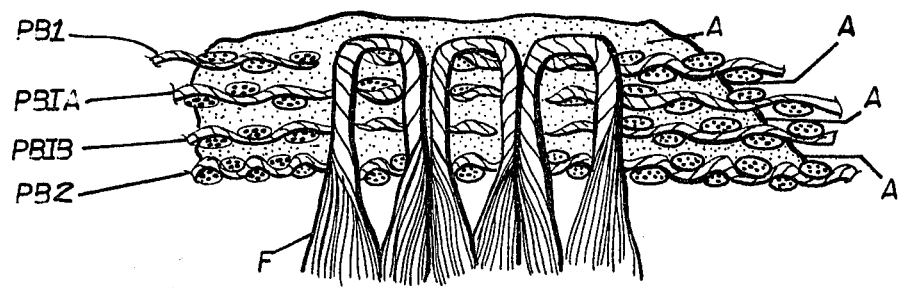

TUFTED CARPETING, ESPECIALLY ARTIFICIAL TURF, WITH TUFTS STITCHED THROUGH MULTIPLE LAYERS OF PRE-WOVEN BACKING MATERIAL OF DIFFERING GAUGE

BACKGROUND OF THE INVENTION

In the production of tufted carpeting, a tufting machine, which resembles a sewing machine except that it has instead of a single needle, a whole row of needles or a couple of adjacent rows of staggered needles, is used to stitch face loops into a pre-formed layer of backing. Loopers are used in conjunction with the needles to maintain at a desired pile height the yarn loops which are being inserted. If the carpet is to be of sheared pile the looping upper ends of the pile are sheared off, often using knives which are associated scissors-fashion with the loopers.

(Tufted carpeting is to be contrasted with woven carpeting. In the production of woven carpeting, the backing is woven simultaneously with the insertion of the pile yarn.)

Generally the primary backing used for the production of tufted carpeting is a rather open-weave canvas-like textile material, e.g. made of polypropylene, especially where the carpeting is to be used out of doors, as artificial turf for a playing surface such as a football field at a stadium. Sometimes the primary backing of tufted carpet is a molded or extruded netting rather than a woven product, or it may be a sheet of extruded plastic sheeting or a non-woven sheet of interlaced and thermally bonded, non-woven plastic fibers. Generally these types of non-woven backings are for lighter-duty tufted carpeting and would be unsuitable for production of tufted carpeting-type artificial turf.

Tufted carpeting generally is made "upside down" in the sense that as the primary backing is pulled from a feed roll and across the horizontal bedplate of the tufting machine the loops are stitched downwards through the backing so that the pile is formed below the plane of the primary backing. Then, some type of adhesive and/or a secondary backing, either of which may include a layer of foamed rubber or plastic padding or self-underlayment are applied, usually in a downward direction or a sideways direction on the exposed surface which is to become the underside of the carpeting.

Artificial turf is a subcategory of tufted carpeting. It shares many qualities and manufacturing techniques in common with tufted carpeting that is used in homes, offices and commercial facilities. However, it is distinctive in needing to be especially resistant to snagging, backing-ripping and other possible personal injury-causing and personal injury-exacerbating reactions to player's rough activities carried out thereon. In general, it is an industry practice when making tufted carpeting-type artificial turf to use a heavy-duty primary backing. However, there appears to be a limit to how heavy-duty a layer of primary backing can be used. If the gauge is too fine, there is a danger of backing ripping due to unrelieved tension of the pile. If the gauge is too coarse, the pile anchoring adhesive can leak onto the face ruining the turf-like character of the product, and an unacceptable rate of damage to the tufting needles, looper mechanisms and knives may occur.

SUMMARY OF THE INVENTION

For producing tufted carpeting, especially for use as artificial turf for football fields and the like, the pile is stitched through two or more layers of woven backing fabric and then what will become the underside is coated with a pile-anchoring adhesive. The backing layers are of progressively finer gauge toward the face, with that closest to the face being sufficiently fine to prevent adhesive from leaking through to the face during application of the adhesive. By preference the backing layers range in gauge from 11 picks per inch to 20 picks per inch.

The principles of the invention will be further discussed with reference to the drawings wherein preferred embodiments are shown. The specifics illustrated in the drawings are intended to exemplify, rather than limit, aspects of the invention as defined in the claims.

BRIEF DESCRIPTION OF THE DRAWINGS

In the Drawings

FIG. 1 is a schematic side elevation diagram of a workstation for carrying out manufacture of a first embodiment of the product of the invention.

FIG. 2 is an exploded fragmentary perspective view of the product that is shown being made in FIG. 1; and FIG. 3 is a fragmentary longitudinal sectional view of that product. A transverse sectional view would look practically the same.

FIG. 4 is an exploded fragmentary perspective view of a second embodiment of the product; and FIG. 5 is a fragmentary longitudinal sectional view of that product. Again, a transverse sectional view would look practically the same.

DETAILED DESCRIPTION OF THE PRESENTLY PREFERRED EMBODIMENTS

This invention relates to the tufting or products which may be used as floor coverings, wall coverings and the like, wherever "carpeting" is used. It particularly relates to the tufting of such products where durability and weather resistance are especially required, as in artificial lawns, outdoor surface coverings for patios and swimming pool margins, recreation-area surface coverings and coverings for the playing surfaces of sports facilities such as those where football, baseball, rugby, soccer, field hockey, lacrosse games and similar contexts are carried on. Such tufted carpeting products are collectively referred to herein as "artificial turf".

In FIG. 1 there is illustrated a tufting machine 10 which includes a row of downwardly-pointing needles 12 mounted on a needle bar 14 for vertical reciprocation toward, through and back from slots in a bed plate 16. Under the bed plate are respective loopers 18 and knives 20. All this is conventional. As a primary backing is fed across the bedplate (i.e. to the right in FIG. 1), the needle bar is reciprocated and carpeting yarn is payed off the spools 22 so that the needles stitch it through the primary backing. A respective looper 18 catches each loop so that as a needle withdraws, the respective pile loop is formed and maintained below the backing. Knives 20 coacting with the respective loopers sheer the loops producing a cut pile carpet with its pile projecting downwards, i.e. the carpeting is formed upside down in comparison to orientation of the carpeting in use. After the pile loops are formed and cut, an adhesive is applied, e.g. by downwardly spraying or flowing an adhesive composition in liquid form against the upwardly presented underside of the tufted carpeting intermediate, e.g. using a spraying device or coater illustrated at 24, then cooling, curing and/or drying the adhesive, e.g. as suggested at 26, then reeling-up the finished product. Additional finishing steps may be involved, such as applying bindings to the edges. Where the product is an artificial turf for a large playing field where several strips of the artificial turf may be used in an edge-to-edge relation, the binding may take the form of one-half of a zipper-type or similar type of set of a series of interdigitable teeth or other releasable margin-joining fastener members.

What is new about what is shown in FIG. 1 is that a plurality (in this instance two) layers of backing PB1 and PB2 are being simultaneously fed from respective supply rolls 28, 30, and guided, e.g. by guide rolls 32 into vertical juxtaposition for feeding onto the bedplate as a multiple layer (in this instance double layer) subassembly of backing material. The gauges of the layers of backing are progressively varied from coarse to fine as one proceeds from the back to the face of the product, i.e. downwards in FIG. 1.

By way of example, the coarsest layer of backing, PB1, is a woven, open-weave canvas of polypropylene tufted carpet backing fiber with a density of 11 picks (weaves) per inch and PB2 is an identical material but of denser weave, preferably 20 picks per inch.

(Where, as in FIGS. 4 and 5 more than two layers of backing are used, the layers are fed off individual rolls and guided into a multiple layer stack for feeding across the bed plate, where the stack is tufted, then back coated and the product is reeled up, just as with the double backed version. Where there are more than two layers of stitched-through backing fabric, the intermediate layers are to be of intermediate gauge, and preferably made of the same material. For instance where there are four layers, the coarsest layer PB1 may have a density of 11 picks per inch, the first intermediate layer PB1A a density of 14 picks per inch, the second intermediate layer PB1B a density of 17 picks per inch, and the layer PB2 nearest the pile a density of 20 picks per inch. The gauges of the individual layers need not be spaced evenly throughout the range; two or more of the layers could be of the same gauge as one another.)

Each backing layer is preferably made of the identical tufted carpeting backing material that is conventionally used as single layer primary backing for products having the same use.

In the example, the tufting process provides the layers of backing with tufted pile F consisting of sheared loops having a collective weight of, e.g. 56.9 ounces per square yard (7600 denier), when making artifical turf. In this case, the pile F is made of the same type of polypropylene thread or yarn that is conventionally used in the manufacture of artificial turf.

Further, the adhesive A may be constituted by a latex bonding agent of conventional composition, conventionally applied and cooled, cured and/or dried to a non-tacking state prior to roll-up of the finished product. Other known alternative bonding agents may be used, such as urethane, whether or not foamed.

A conventional secondary backing (not tufted-through) may be conventionally applied.

Practicing the invention provides an artificial turf product of enhanced strength, improved dimensional stability, improved wearability, improved binding of the face to the primary backing and improved facial texture compared to conventional products manufactured in the traditional way with one primary backing.

The increasing density of the primary backing layers toward the face provides a means for strongly anchoring the tufts in the primary backing, yet a means for preventing the bonding agent from leaking to the surface of the pile. Because the composite primary backing is thicker than conventional single-layer woven backing, a greater percentage of the length of each tuft is anchored in and adhered to the backing. Because the weaves or picks of the various layers of backing are not in registry, but are of irregular geometry when compared with one another due to the progression of gauge, each stitch where it projects into and through the plurality of layers of primary backing is subjected to lateral forces, essentially normal to the pile height, which serve to mechanically hold the tufts more firmly in place than would be the case with either a single backing or multiple backings with some common multiple of picks (weaves) per inch.

In practice the number of layers of primary backing material will depend upon the characteristics sought in the final product and the ability of the tufting machine to stitch through the composite.

It should now be apparent that the tufted carpeting, especially artificial turf, with tufts stitched through multiple layers of pre-woven backing material of differing gauge as described hereinabove, possesses each of the attributes set forth in the specification under the heading "Summary of the Invention" hereinbefore. Because it can be modified to some extent without departing from the principles thereof as they have been outlined and explained in this specification, the present invention should be understood as encompassing all such modifications as are within the spirit and scope of the following claims.

What is claimed is:

1. A tufted carpet for use as artificial turf, comprising:
   a first layer of woven synthetic plastic primary backing material having a first, smaller number of picks per inch on the order of 11 picks per inch so that it is of a coarser weave;
   a second layer of woven synthetic plastic primary backing material having a second, larger number of picks per inch on the order of 20 picks per inch so that it is of a finer weave;
   a pile of yarn or threads, of synthetic plastic material simulating grass, tufted through both of said layers of primary backing material so as to have a face protruding from the finer weave second layer of woven primary backing material;
   the number of picks per inch of the second layer of woven primary backing material being no integer multiple of the number of picks per inch of the first layer of woven primary backing material;
   means bonding the tufted pile to the second layer of woven primary backing material, said bonding means being constituted by an adhesive bonding agent which has been applied in liquid form by a coater while the coarser weave first layer of primary backing material faces the coater, and the bonding agent has penetrated to but not substantially through the finer weave second layer of primary backing material.

2. The tufted carpet of claim 1, wherein:
the pile is made of 7600 denier polypropylene artificial grass.

3. The tufted carpet of claim 1, wherein:
the bonding agent is a latex composition.

4. The tufted carpet of claim 1, wherein:
the bonding agent is a urethane composition.

5. The tufted carpet of claim 1, further including:

at least one additional layer of primary backing material sandwiched between the first and second layers of woven primary backing material, the pile of yarn or threads being tufted through all of said layers.

6. The tufted carpet of claim 5, wherein:
each said additional layer of primary backing material is pre-woven so as to have a number of picks per inch which is no smaller than that of said first layer of woven primary backing material, no larger than that of said second layer of woven primary backing material, and which is no integer multiple of the number of picks per inch of the first layer of woven primary backing material.

7. The tufted carpet of claim 6, wherein:
the pile and layers of primary backing material are made of synthetic plastic material simulating grass for use as artificial turf.

8. The tufted carpet of claim 7, wherein:
the bonding agent is an adhesive bonding agent which has been applied in liquid form by a coater while the coarser weave first layer of primary backing material faces the coater, and the bonding agent has penetrated to but not substantially through the finer weave second layer of primary backing material.

* * * * *